United States Patent [19]

Cohen

[11] Patent Number: 5,257,358

[45] Date of Patent: Oct. 26, 1993

[54] METHOD FOR COUNTING THE NUMBER OF PROGRAM INSTRUCTION COMPLETED BY A MICROPROCESSOR

[75] Inventor: Paul E. Cohen, Hopkinton, Mass.

[73] Assignee: NEC Electronics, Inc., Mountain View, Calif.

[21] Appl. No.: 979,347

[22] Filed: Nov. 20, 1992

Related U.S. Application Data

[63] Continuation of Ser. No. 339,770, Apr. 18, 1989, abandoned.

[51] Int. Cl.[5] .......................... G06F 1/04; G06F 9/26; G06F 9/30; G06F 9/40
[52] U.S. Cl. .................................. 395/375; 364/238.2; 364/238.3; 364/238.9; 364/239.1; 364/240; 364/242; 364/247; 364/247.7; 364/247.8; 364/251.4; 364/259.9; 364/261.8; 364/261.9; 364/262.4; 364/262.8; 364/263.3; 364/267; 364/265.6; 364/267.5; 364/267.91; 364/266; 364/270.4; 364/275.8; 364/DIG. 1; 364/DIG. 2
[58] Field of Search ............... 395/800, 375, 325, 250, 395/275, 550, 400, 425, 575, 725, 700; 364/DIG. 1, DIG. 2; 371/16.1

[56] References Cited

U.S. PATENT DOCUMENTS

| 4,099,230 | 7/1978 | Mead | 364/200 |
|---|---|---|---|
| 4,173,041 | 10/1979 | Dvorak et al. | 364/200 |
| 4,292,667 | 9/1981 | Catiller et al. | 395/275 |
| 4,297,743 | 10/1981 | Appell et al. | 364/200 |
| 4,316,245 | 2/1982 | Luu et al. | 364/200 |
| 4,342,078 | 7/1982 | Tredennick et al. | 364/200 |
| 4,740,969 | 4/1988 | Fremont | 371/13 |
| 4,787,065 | 11/1988 | Barazesh et al. | 395/425 |
| 4,788,683 | 11/1989 | Hester et al. | 371/16.1 |
| 4,811,345 | 3/1989 | Johnson | 371/16.1 |
| 4,847,448 | 6/1989 | Yamahata et al. | 395/375 |
| 4,953,121 | 8/1990 | Muller | 395/375 |
| 4,956,800 | 9/1990 | Kametani | 395/375 |

OTHER PUBLICATIONS

Logic Data Book vol. I, National Semiconductor Corp. pp. 5/94-5-5/99; 5/226-5/230, 6/90-6/93, 1984.

*Primary Examiner*—Robert B. Harrell
*Assistant Examiner*—Daniel H. Pan
*Attorney, Agent, or Firm*—Skjerven, Morrill, MacPherson, Franklin & Friel

[57] ABSTRACT

A means for precisely identifying the location of an error in a computer program executing in a microprocessor is provided by an instruction complete counter circuit that counts each of the program instructions completed by the microprocessor up to the time of an error in execution.

5 Claims, 4 Drawing Sheets

| VECTOR | SYSTEM BASE TABLE | OFFSET |
|---|---|---|
| 255 | APPLICATION INTERRUPT VECTORS (MASKABLE INTERRUPTS) | +1020 |
| ... | | ... |
| 64 | | +256 |
| 63 | SOFTWARE TRAP 15 | +252 |
| 62 | SOFTWARE TRAP 14 | +248 |
| 61 | SOFTWARE TRAP 13 | +244 |
| 60 | SOFTWARE TRAP 12 | +240 |
| 59 | SOFTWARE TRAP 11 | +236 |
| 58 | SOFTWARE TRAP 10 | +232 |
| 57 | SOFTWARE TRAP 9 | +228 |
| 56 | SOFTWARE TRAP 8 | +224 |
| 55 | SOFTWARE TRAP 7 | +220 |
| 54 | SOFTWARE TRAP 6 | +216 |
| 53 | SOFTWARE TRAP 5 | +212 |
| 52 | SOFTWARE TRAP 4 | +208 |
| 51 | SOFTWARE TRAP 3 | +204 |
| 50 | SOFTWARE TRAP 2 | +200 |
| 49 | SOFTWARE TRAP 1 | +196 |
| 48 | SOFTWARE TRAP 0 | +192 |
| 47 | | +188 |
| ... | RFU | ... |
| 33 | | +132 |
| 32 | EMULSION MODE EXCEPTION | +128 |
| 31 | RFU | +124 |
| 30 | RFU | +120 |
| 29 | ASYNCHRONOUS TASK TRAP | +116 |
| 28 | ASYNCHRONOUS SYSTEM TRAP | +112 |
| 27 | CHANGE TO EXECUTION LEVEL 3 | +106 |
| 26 | CHANGE TO EXECUTION LEVEL 2 | +104 |
| 25 | CHANGE TO EXECUTION LEVEL 1 | +100 |
| 24 | CHANGE TO EXECUTION LEVEL 0 | +96 |
| 23 | DECIMAL ARITHMETIC EXCEPTION | +92 |
| 22 | FLOATING POINT ARITHMETIC EXCEPTION | +88 |

Fig. 2-1
Prior Art

| | | |
|---|---|---|
| 21 | INTEGER ARITHMETIC EXCEPTION | +84 |
| 20 | ILLEGAL DATA FIELD EXCEPTION | +80 |
| 19 | ILLEGAL ADDRESSING MODE EXCEPTION | +76 |
| 18 | RESERVED ADDRESSING MODE EXCEPTION | +72 |
| 17 | PRIVILEGED INSTRUCTION EXCEPTION | +68 |
| 16 | RESERVED OPCODE EXCEPTION | +64 |
| 15 | RFU | +60 |
| 14 | ADDRESS TRAP | +56 |
| 13 | INSTRUCTION BREAKPOINT EXCEPTION | +52 |
| 12 | INSTRUCTION TRACE EXCEPTION | +48 |
| 11 | ADDRESS TRANSLATION EXCEPTION | +44 |
| 10 | MEMORY PROTECTION EXCEPTION | +40 |
| 9 | PAGE NOT PRESENT EXCEPTION | +36 |
| 8 | AREA NOT PRESENT EXCEPTION | +32 |
| 7 | STACK INVALID EXCEPTION | +28 |
| 6 | RFU | +24 |
| 5 | RFU | +20 |
| 4 | SYSTEM FAULT | +16 |
| 3 | SERIOUS SYSTEM FAULT | +12 |
| 2 | NON-MASKABLE INTERRUPT | +8 |
| 1 | BUS FREEZE | +4 |
| 0 | RFU | ← SYSTEM BASE REGISTER (SBR) |

Fig. 2-2
Prior Art

KEY TO Fig. 2

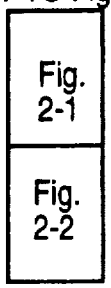

METHOD FOR COUNTING THE NUMBER OF PROGRAM INSTRUCTION COMPLETED BY A MICROPROCESSOR

This application is a continuation of application Ser. No. 07/339,770, filed Apr. 18, 1989, now abandoned.

BACKGROUND OF THE INVENTION

1. Field of the Invention

This invention relates generally to microprocessors and more specifically to a microprocessor having circuitry to assist in debugging a computer program by providing a means for precisely locating errors in the program.

2. Prior Art

When a computer program is executed on a microprocessor, the program may not function correctly. For example, the program may provide some results which are correct and other results which are incorrect; or the program may execute for a period of time but then abnormally terminate execution. Assuming that the hardware is operating correctly, the cause of the erroneous behavior in each of the examples is usually an error, a bug, in the computer program. Finding a computer program error often requires considerable effort because microprocessors lack a means for automatically identifying the location of the program step or steps which produce the erroneous results.

To identify the location of the bug, the programmer must first identify the area of the program in which the bug is likely to have occurred. The programmer must then test whether the identified area of the computer program includes the bug. If the identified area includes the bug, the programmer divides and further subdivides that area of the program until the precise location of the bug is found.

Locating a bug is further complicated by the fact that steps in a computer program are often executed repeatedly, possibly millions of times in each execution of the program, and the bug may manifest itself only on rare occasions. In such a situation, locating a bug involves not only finding the program line or lines which contain the error but also determining which execution of the program line is responsible for the problem.

One common approach to isolating a bug is to insert debugging print statements into the computer program. In this approach, the programmer has the program print information that seems relevant and useful at selected locations in the program so that when an error occurs the general location of the error within the program can be identified. However, debugging print statements are inefficient because the location of an error is not identified mechanically, but rather through considerable human effort and intelligence. Moreover, this approach involves a time-consuming modification of the defective program and as a result of the modifications, the symptoms of the bug may change or even disappear.

In many high level language programming environments and in most assembly language programming environments, a computer program, referred to as an on-line debugger (debugger), is available to allow interactive debugging of the user's program. The on-line debugger uses specialized facilities of the microprocessor, described below, to generate information to aid in identifying a bug. A debugger usually provides facilities, such as single stepping and breakpoints, that allow the programmer to stop a program and subsequently examine or modify the contents of registers and memory of the microprocessor. Sophisticated debuggers allow programmers to use the same symbolic names that the program source uses to examine and modify data values in memory.

With single stepping, the user program is executed one instruction at a time, with control returning to the debugger after each step. After each program step, the debugger can request the programmer to specify what he wants to do next, but often the debugger is configured to examine memory or register values and make decisions about whether to print out such information or to request further instructions from the programmer's keyboard. Even with such automatic actions on the part of the debugger, however, single-stepping tends to be a very slow mode of operation. For example, a system operating at 1 million instructions per second may be slowed to perhaps a thousand user-program instructions per second. With single stepping, a program that failed after 30 seconds of normal operation takes eight hours to fail.

Breakpoints offer an alternative to single stepping. Breakpoints allow a program to be executed at full speed until a particular instruction, a breakpoint, in the program is reached. Since a breakpoint is set by the programmer, the programmer must select, in advance, where execution is to stop. Setting breakpoints skillfully is an art that a programmer learns through experience.

Often, breakpoints are used in conjunction with single stepping to debug a program. A programmer first runs the program to understand the symptoms of the error. The programmer makes an educated guess, based on those symptoms, as to where in the program the bug is likely to be located. The debugger is then used to set one or more breakpoints in an effort to cause the execution of the program to stop just before the program enters the suspected area (or areas). When the program is run again, if the bug is observed to occur before a breakpoint is reached, new breakpoints must be set and the whole process repeated. Considerable skill and effort is often expended just to stop the program a few instructions prior to where it would terminate as a result of a bug in the code.

If, however, a breakpoint causes execution to stop before the bug occurs, the debugger can be used to examine registers and memory in an effort to determine whether the values are reasonable and/or correct. At this point the program can be single stepped through any number of instructions and the values in memory and registers examined in an effort to understand the program's behavior and to locate the bug. There is, however, no guarantee that only some small and manageable number of instructions remain to be executed before the symptoms of the bug appear. If single stepping does not reveal the cause of the bug, the breakpoints must be moved and the entire process repeated. Alternatively, if data is simply printed at each step, an enormous amount of data may have to be studied before the bug is discovered. In either case, human effort and ingenuity is required.

Most modern microprocessors support the previously described methods of debugging. For example, the $\mu$PD70616(V60) provides three independent hardware aids to support debuggers. These aids are (i) instruction breakpoints, (ii) instruction trace and (iii) address traps. Typically, the instruction breakpoint facility is used to implement program flow debugging, as previously described. An instruction breakpoint is set by replacing the first byte of an instruction with the one byte "BRK" instruction. The program executes at full speed until the BRK instruction is executed. The BRK instruction causes a breakpoint trap to occur. When the breakpoint trap occurs, the state of the microprocessor is saved to memory and the processor begins execution of software, the breakpoint trap handler, that is part of the debugger. Since the previous state of the microprocessor including register values has been saved to memory that is accessible by the debugger, the debugger can examine, and even modify, the previous state of the microprocessor as represented in memory. Either the previous state, or some modification of the previous state, can be loaded from memory into the microprocessor and execution of the user's program resumed.

In the V60, the instruction tracing mechanism supports single stepping, as previously described. A field in one of the microprocessor's registers, the program status word (PSW) as illustrated in FIG. 1, is used to control instruction tracing. When instruction tracing is enabled, a trace trap occurs after each instruction execution. When a trace trap occurs, the microprocessor's behavior is much the same as when a breakpoint trap occurs and with the same purpose of allowing the debugger program to intervene.

The V60 microprocessor supports another debugging facility, one which is not found on other microprocessors. Address traps, when they occur, are similar in behavior to trace traps and to breakpoint traps. In each case the objective is to suspend the user's program so that the debugger can execute until the debugger later allows the user's program to resume. The distinction between these three kinds of traps lies primarily in what initiates the traps. Trace traps (when enabled) occur after each instruction whereas breakpoint traps occur whenever the V60 executes a BRK instruction. Address traps, in contrast, occur (if enabled by a bit in the PSW) whenever the V60 initiates a specified kind of memory reference. A debugger specifies which memory references are to cause address traps by configuring registers in the microprocessor, specifically, registers identified as ADTR0, ADTR1, ADTMR0, ADTMR1 and TRMOD.

The V60 generally initiates several memory references for each instruction that it executes. First, the instruction must be read from memory. This memory reference is called an "execute access". Also, a data value must often be read from memory in a "read access". Similarly, a data value must often be written to memory in a "write access". The TRMOD register is used to specify whether read, write or execute accesses are to be candidates for generating address traps.

A V60 program identifies, through a 32-bit "virtual address", which location in memory a given memory access affects. The ADTR0, ADTR1, ADTMR0 and ADTMR1 registers are used to specify which virtual address or addresses are to generate address traps. One range of virtual addresses can be specified with the register pair ADTR0, ADTMR0 and another with the registers ADTR1, ADTMR1.

In brief, when address traps are enabled, an address trap will only occur if the V60 initiates a memory access of a type (read, write or execute) enabled by bits in the TRMOD register at a virtual address which matches the address specified by ADTR0 on at least all of the bits that are set to 1 in the ADTRM0 register. When address traps are enabled, an address trap occurs if the V60 initiates a memory access of an enabled type at a virtual address which matches the address specified by ADTR1 on all of the bits that are set to 1 in the ADTRM1 register. By using address traps, a debugger can allow a program to run at full speed until, for example, a write is initiated to some predetermined address.

The mechanisms, described above, wherein an executing program (task) is suspended, the microprocessor state saved, and another code (a trap handler) executed, are general mechanisms that the V60 shares with many other microprocessors. An almost identical mechanism exists to invoke an interrupt handler (rather than a trap handler). The difference is that an interrupt is initiated by a hardware signal from another device external to the microprocessor. A trap handler is invoked by an event, usually caused by software, that is internal to the microprocessor. Traps often occur because bugs in an executing program request the microprocessor to perform an illegal operation, but in some instances, such as in debugging, traps are intentionally initiated by software. Interrupts are typically used to cause a computing system to respond to some physical event such as a clock tick. The term "exception" is often used to refer to either a trap or interrupt.

FIG. 2 shows the system base table for the V60, which is stored in memory. The V60 uses the system base table to invoke either a software trap or an interrupt handler. Specifically, the V60 determines which entry in the system base table is appropriate either from the nature of the event in the case of traps, or from a data value called an interrupt vector which hardware external to the V60 presents to the V60 data pins (much as data from memory would be presented in other circumstances).

The V60 is intended for use in a multi-tasking computer system in which operating system software supervises the activities of one or more user tasks. In this kind of system, it is necessary to restrict what user tasks are allowed to do so that one user task cannot interfere with the work of another user task. The V60 makes this possible through the use of "execution levels". Critical parts of the operating system are allowed to assume execution level 0, which removes all constraints on what software is allowed to do. At execution levels that are assigned higher numbers, some instructions are disallowed and access to various regions of memory becomes restricted. Generally, more restrictions are placed on programs as the number of the execution level increases. How different execution levels are used in a given computer system is very much an option of the operating system designer. In general, however, the most critical parts of the operating system, sometimes referred to as the kernel of the operating system, execute at level 0 and user programs execute at a more restricted, higher numbered, level. Probably the most common use of execution levels includes only two execution levels. With two execution levels, all programs but the critical parts of the operating system run at the higher numbered (more restricted) execution level.

The program status word (PSW) of the μPD70616(V60) is shown in FIG. 1 as an example of a typical microprocessor PSW. The PSW is divided into four 8-bit fields: an integer field, 40; a floating point field, 50; a control field, 60; and a task status field, 70. It should be observed that the execution level itself is part of the task status field, bits 24–25. Also in the upper half of the PSW is bit 16, which enables trace traps, and bit 17, which enables address traps. Bits 4–7, 13–15 and 19–23 of the PSW are unused.

The upper half of the PSW is vital to the security of a computer system based on the V60. For this reason, the instruction to write the upper half of the PSW register can be executed only when the V60 is operating at execution level 0. The other way that the upper half of the PSW can be changed (in fact, the way that the execution level typically becomes 0) is when the V60 enters an exception handler. The execution level that an exception handler assumes is specified in the system base table (See FIG. 2).

While many microprocessors support some aids to debugging such as have been described above, no existing microprocessor provides a direct means for determining the location of a program error. Hence, the programmer must expend considerable effort just to locate such a software error.

SUMMARY OF THE INVENTION

A processor, according to the principles of this invention, includes a means for precisely locating the instruction in a computer program, and for precisely locating which execution of that instruction caused an error that terminated execution of the program without using the iterative debugging methods of the prior art. The processor of this invention includes means for generating a signal upon completion of each of the instructions executed by the microprocessor. In one embodiment, a control unit in the microprocessor is the means for generating an "instruction complete" signal after the completion of each logic operation, each arithmetic operation and each instruction of any other kind, such as branch instructions. The "instruction complete" signal is the same signal that is used in prior art for initiating trace traps. The "instruction complete" signal is provided to a counting means which counts the number of "instruction complete" signals from the control unit.

Operating system software, which initiates execution of a user task reads the instruction complete counter and saves that value (or, alternatively, sets the instruction complete counter to a known value, such as the largest value that can be expressed in the counter word-size). When execution of the user task terminates, the operating system software reads the counter a second time and determines the total number of instructions that were executed by subtracting the later reading from the earlier one. If the user task is terminated by a bug, the number of completed instructions is used to isolate the bug.

To isolate a computer program error, debugging software, which is part of the operating system software, sets the counting means, which is a decrementing counter in one embodiment, to a user selected number which is somewhat smaller than the total number of instructions executed in the prior run of the program. The debugging software also enables an "instruction complete counter trap". Upon each "instruction complete" signal from the control unit, the number in the counter is decremented by one. When the counter reaches zero, the counter generates an output signal which forces an instruction complete counter trap which in turn allows the debugger program to intervene. The debugger then uses the prior art debugging facilities of the microprocessor, such as trace trapping, to study the error as it occurs.

The multiple executions of the program required to isolate the program error using only prior art debugging techniques have been eliminated. Using the microprocessor to this invention, the programmer proceeds directly to the source of the error and starts analysis of the error without expending either the computer resources or the time that were required previously to isolate the error. Accordingly, the microprocessor of this invention represents a significant breakthrough in debugging of computer software.

In addition to debugging applications, it is possible to take measurements of the performance of a microprocessor having an instruction complete counter, according to the principles of this invention, by reading the instruction complete counter at selected intervals. Similar measurements for prior art microprocessors required external equipment and/or statistical analyses.

BRIEF DESCRIPTION OF THE DRAWINGS

FIGS. 2-1 and 2-2 illustrate the prior art System Base table which governs the exceptions that the V60 microprocessor supports.

DETAILED DESCRIPTION OF THE INVENTION

Figure 1:
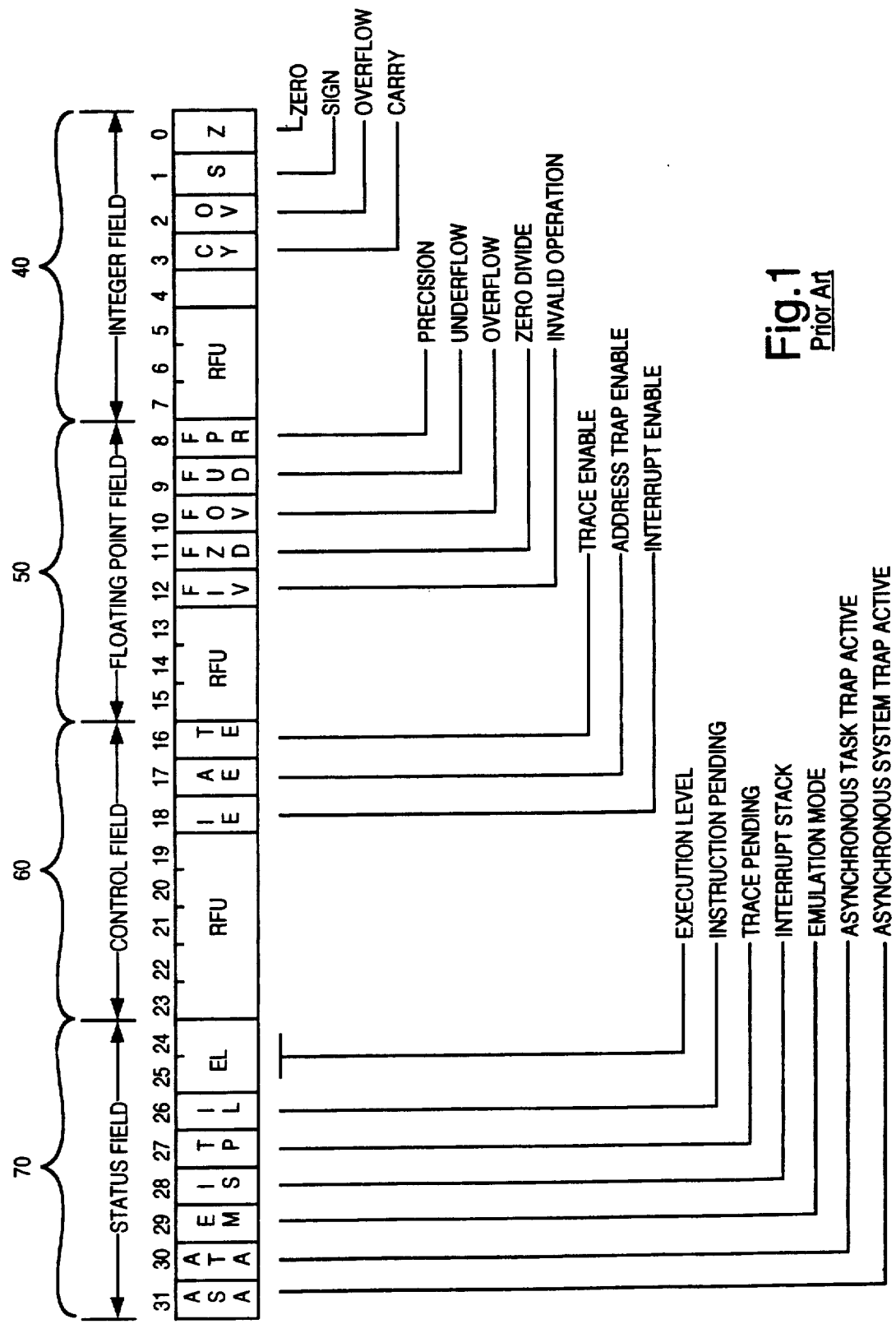
FIG. 1 illustrates a typical configuration for a prior art program status word of the V60 microprocessor.

A microprocessor, according to the principles of this invention, includes not only the conventional hardware aids for debugging such as single stepping, instruction trace, and address traps, but also a means for precisely locating, without using the prior art iterative debugging methods, an instruction which causes an error that terminates execution of a program.

Thus, the programmer is no longer confronted with the tedious task of using reasoning and intuition as required by the prior art microprocessor debugging facilities to gather evidence for identifying a program error. Rather, using the microprocessor of this invention, the computer system identifies for the programmer the number of instructions that executed prior to the terminated execution of the program. The programmer, using debugger software, restarts the program and initializes an instruction complete counter trap. The instruction complete counter trap, described more completely below, is initialized so that the trap occurs just before the program would have terminated prematurely as the result of a bug.

The effect of the instruction complete counter trap is equivalent to the prior art breakpoint trap. However, the instruction complete counter trap is initiated by completion of a selected number of microprocessor instructions rather than by reaching a breakpoint instruction in the executing computer program. Thus, the program executes at full speed until the instruction complete counter trap occurs. Upon reaching the instruction complete counter trap, a software debugger is invoked and prior art debugging facilities are used to analyze the error.

The multiple runs, previously required just to locate the error in the computer program (software), have been eliminated. When an error is encountered, the programmer proceeds directly to the point in the software where the error became apparent, and starts analysis of the reasons for the error. Hence, the microprocessor of this invention provides a significant improvement in utilization of the programmer's time as well as a reduction in the use of computing resources.

While the principles of this invention are described in conjunction with a microprocessor, the examples are illustrative only and are not intended to limit the scope of the invention to the specific embodiments presented. The "principles of this invention are applicable to any processor that executes program instructions. Moreover, as explained more completely below, the instruction complete counter of this invention may be used to assess the performance of the processor in which the counter is incorporated independently of the debugging applications.

In one embodiment, a microprocessor has two or more execution levels and includes an instruction complete counter for each execution level except execution level 0. As previously described, the assignment of numbers to execution levels of a microprocessor is somewhat arbitrary. As used herein, execution level 0 is the level at which the most critical part of the operating system executes, and higher numbered execution levels execute programs at a more restricted level.

According to the principles of this invention, the instruction set of the microprocessor includes instructions to read and to write the instruction complete counters, as described below. Thus, the instruction complete counters are programmable since a counter can be set to count a selected number of completed instructions by using a write instruction to initialize the counter, as described more completely below. The instruction complete counter for a given execution level counts each instruction completed by the microprocessor while the microprocessor is at that execution level.

Specifically, when a program is loaded by the microprocessor, the instruction complete counter for the execution level of the program is either read or set to a known value and that initial value is recorded. Upon either normal or abnormal completion of the program, the instruction complete counter for the execution level at which the program is executing is read again and the difference between the two values is calculated. This difference is the number of instructions executed by the program.

In this embodiment, the operating system software of the microprocessor is modified so that the operating system software that initiates tasks reads and records the appropriate instruction complete counter, and the operating system software that terminates tasks reads the appropriate instruction complete counter and calculates the difference between the two instruction complete counter readings. Thus, the number of completed instructions is determined upon either normal or abnormal termination of a user program. Since the operating system software typically reads counters and registers, the modifications to the software for a particular operating system to read and write the instruction complete counter are apparent to those skilled in the art.

The difference in the instruction complete counter readings is reported in a manner that is appropriate for the computing system. In the case of a general computing environment, the difference can be printed on the user's console or listing, whereas in a controller environment, the difference can be recorded on a maintenance log.

In another embodiment, the operating system software reads the instruction complete counter and calculates a difference in readings only when requested rather than upon task initiation and task termination as described above. An analogy exists in the Unix operating system with the "time" command which reports how long a task took to operate. In the Unix operating system, the reporting of time is done only on request. However, generally the count of instructions executed is useful information, and the time overhead involved in performing the measurement is small enough that it is reasonable to always perform the instruction count measurement. One exception is in critical real-time applications where even a small extra overhead should be avoided.

When a program error terminates execution of a computer program, the operating system, according to the principles of this invention, determines the number of instructions that have been executed prior to the error, as described above. The program can then be reloaded with the instruction complete counter initialized, as described "below, to a value that the programmer selects, but which is less than the number of instructions executed when the error occurred.

After the microprocessor has executed the number of instructions loaded into the instruction complete counter, the instruction complete counter generates a signal which in conjunction with an instruction complete counter trap enablement signal forces the microprocessor to leave the program being debugged and begin executing the instruction complete counter trap handler, which is part of the debugger. Details of this trap handler depend not only upon the microprocessor in which this invention is implemented, but also upon the operating system and the debugger. However, traps and the operation of trap handlers are known to those skilled in the art. See, for example, A. M. Lister, *Fundamentals of Operating Systems*, Springer-Verlag, N.Y., 1975, 1979. After the instruction complete counter trap handler transfers control to the debugger, the program is single stepped through the instructions remaining prior to the error so that the programmer obtains a dynamic representation of the error without first expending any effort to isolate the location of the error which shortly thereafter causes program execution to terminate abnormally.

The modification of the operating system software and the debugger to include the instructions to read and write to the instruction complete counter, to determine the difference in instruction complete counter readings, to record the difference in instruction complete counter readings, and to invoke the instruction complete counter trap handler are similar to operations normally performed by operating system software, debuggers and trap handlers. For example, the breakpoint trap and trace traps, described previously, function in a manner similar to the instruction complete counter trap, except the initiating event is different. Therefore, the necessary modifications for a particular processor, operating system and debugger, including trap handlers will be apparent to those skilled in the art. Nevertheless, there are some factors that must be considered in making such modifications.

For example, the operating system software must guarantee that events like traps and interrupts, which cause user programs to be suspended so that the operating system can gain access to the microprocessor, do not disturb the instruction count value, i.e., instructions related to traps and interrupts must not be counted by the instruction complete counter.

In the microprocessor, described above, where the trap or interrupt handlers operate at execution level 0, or at least on an execution level that is different than that of the user program, the instruction counter for the execution level of the user program is not affected by instructions executed by the trap or interrupt handlers. Thus, the microprocessor hardware in this embodiment provides the necessary isolation.

If the user program and the trap or interrupt handlers execute on the same level, the operating system must guarantee: (i) that the value in the instruction complete counters, which is associated with execution of the user program, is saved whenever other software might corrupt the count; and (ii) that the counter is restored to the previous value before resumption of execution of the user code. In this situation the operating system could allow the counter to change upon interruption of the user program and execution of another program, but the operating system keeps a record of the size of the change associated with execution of the other program.

The instruction complete counters have a fixed size. Thus, each counter counts some limited number of instruction completions before rolling over to the starting value, this event is called overflow. If the instruction complete counter has a large capacity compared to the number of instructions completed in a typical program executed on the microprocessor, overflow of the instruction complete counter is relatively infrequent. For example, with a 32-bit counter, overflow occurs after approximately 4295 million complete instruction executions. The overflow time of the counter is the time required for the 4295 million complete instruction executions. If the microprocessor executes approximately 1 million instructions per second, a program must execute more than one hour before overflow becomes a problem.

Typically, most programs execute in less than one hour and so overflow is a potential problem only in a few limited situations. When a program fails after an hour of execution time, the prior art, single stepping, debugging methods are of especially limited use because the time required to find the bug through single stepping alone is prohibitive. However, according to the principles of this invention, overflow of the instruction complete counter is easily accommodated so that, unlike prior art methods, use of this debugging method is not ruled out because the execution time of a program is too large.

Microprocessor operating system software typically keeps measurements of elapsed execution time by reading a time-of-day clock. Also, it is possible to determine the average number of instruction executions completed by the microprocessor in a second. Using the elapsed execution time for a computer program, the instruction complete counter reading upon termination of program execution and the average number of instructions completed per second by the microprocessor, the number of times that the instruction complete counter has overflowed over is easily ascertained.

Specifically, in one embodiment, the operating system software that initializes tasks, sets the instruction complete counter to the maximum value and the operating system software which terminates tasks is modified not only to compute the difference in instruction complete counter readings between task initiation and task termination, as previously described, but also to determine whether the instruction complete counter overflowed. If the elapsed execution time is less than the overflow time of the instruction complete counter, the difference in instruction complete counter readings is determined as previously described and the usual difference is reported as the count of completed instructions.

If the elapsed execution time is greater than the overflow time of the instruction complete counter, the elapsed execution time is used to calculate an integer which indicates the number of instruction counter complete overflows. Specifically, the elapsed execution time is divided by the overflow time and the quotient is truncated to an integer value. This integer is multiplied by the number of complete instruction executions required for instruction complete counter overflow and the product is added to the difference in instruction complete counter readings.

This method for compensating for counter overflow works provided the number of overflows is fairly small. For example, for the 32-bit counter, overflow occurs after approximately 4,295 million instruction executions. If the elapsed execution time is three hours and the microprocessor executes approximately one million instructions per second, approximately 10,800 million instructions have been executed during the three hours ($3 \times 3,600$). Thus, the execution counter has overflowed twice ($10,800/4,295 = 2$). Therefore, 8,589.9346 million completed instructions are added to the difference in the instruction counter readings to ascertain the actual number of instructions completed. Notice that this method requires knowing, with moderate accuracy, the average number of complete instructions executed per second for the microprocessor. As described more completely below, the instruction complete counter of this invention can be used to measure the average number of instructions completed per second.

While this embodiment provides only an estimate of the number of times the counter has overflowed, this estimate is of an integer. The estimate is either completely accurate or it is incorrect, but when overflow occurs but a small number of times, the estimate is quite reliable for determining with complete precision the number of instructions executed. As previously described, the function of the instruction complete counter is to provide the user with the number of instructions completed upon program termination so that the programmer can reload the program and then stop the program prior to the error.

When overflow of the instruction complete counter is encountered, multiple sequential executions of the computer program are required after the initial execution which determined the number of instructions completed prior to the bug. In the debugging run, the instruction complete counter trap handler is enabled, as described below, and the instruction complete counter is initialized to the largest reading. Upon overflow, the trap handler reloads the instruction complete counter with the maximum value and causes the program to resume execution. This is repeated until the overflow count is reached and then the instruction complete counter is set to the count determined by subtraction, as before, from the initial run and the program resumed the one last time.

In microprocessor systems where overflow is an infrequent problem, a more sophisticated approach to overflow is probably not justifiable. However, if overflow is a frequent or massive problem and an extensive number of overflows per user program execution is anticipated, for example, multi-hour analyses using an 8-bit microprocessor, cascaded counters would be used as the instruction complete counter for each execution level instead of a single instruction complete counter for each execution level. The operation of the cascaded instruction complete counter would be as previously described except the operating system software must be modified so that the cascaded counters are read upon task initiation and task termination rather than a single counter.

An alternative to counters cascaded in hardware for determining the number of instruction completion overflows, is for the operating system software to play the role of cascading the instruction complete counter. In this embodiment, the instruction complete counter is initialized to the maximum value and instruction counter traps are enabled even for ordinary program execution. The instruction complete trap handler increments a software counter to keep count of the number of instruction complete traps that occur before program execution completes (this is the same as the number of instruction counter overflows). After incrementing the software counter, the trap handler, in normal execution use, would simply reset the instruction complete counter to the maximum value and cause the program to resume execution. Provided that overflow of the instruction complete counter is infrequent, this software approach is preferred for its simplicity.

The instruction complete counter is useful in debugging a program when the program is stopped at a breakpoint inside a loop of unknown size. Single stepping through the loop may be useful for learning what the loop does, but doing so without knowing the size of the loop is an intimidating prospect since there may be hundreds, thousands or even millions of steps involved. The instruction complete counter, according to the principles of this invention, provides a ready mechanism for determining whether single stepping through the entire loop is reasonable. By reading the instruction complete counter when stopped at the breakpoint inside the loop and by reading the counter again the next time the program is stopped at the same breakpoint, it is easy to determine how many steps are involved and consequently whether single stepping through the loop is a practical approach.

While the instruction complete counter is intended primarily for software debugging, the instruction complete counter provides the microprocessor user with many other capabilities. For example, the instruction complete counter can be used for a performance evaluation of either the microprocessor or a compiler. The instruction complete counter can be used to make a MIPS (millions of instructions per second) measurement. MIPS is a commonly used measurement of microprocessor performance, but owing to the difficulty of measurement, MIPS is rarely measured accurately. With prior art microprocessors, a MIPS measurement required the use of external hardware such as a logic analyzer. According to the principles of this invention, MIPS is easily and accurately measured using an instruction complete counter.

In this embodiment, the microprocessor operating system software is programmed to take measurements of the number of instructions executed each second, i.e. read the instruction complete counter at selected intervals, as a normal ongoing activity. The operating system may also include programming to calculate a running average of the difference in instruction complete counter readings and/or to report the difference in readings. The programming required for the MIPS measurement again depends upon the microprocessor and the operating system. As previously described, the operating system software changes and additions required to read the instruction counter and calculate the running average are apparent to one skilled in the art.

A real time MIPS measurement according to the principles of this invention is useful information for indicating trouble with the system. For example, a drop from a normal MIPS measurement value is an indication of hardware malfunction. For example, the malfunction could result from some intermittent memory failure which causes memory accesses to be attempted multiple times before they are successful. With prior art microprocessors, such a loss in performance would not be as easily or quickly recognized and measured.

The instruction complete counter, according to the principles of this invention, also makes possible fine grained measurements on the time, as approximated by the dynamic instruction count, spent in particular sections of a program. This measurement is useful in software development to determine which parts of a program are consuming significant amounts of time and therefore are candidates for re-programming in order to improve efficiency. In prior art systems, the system's elapsed time or time-of-day clock is used to determine the time spent in a particular section of code.

The prior art approach presents some difficulties, however, if the code sequence is very short. If, for example, a code sequence executes in 0.001 seconds, but that sequence is executed 20,000 times during the 30 seconds the program executes, the system clock probably cannot distinguish between the time when the processor starts executing the code sequence and the time when it stops. This is because the resolution of most system clocks is greater than 0.001 seconds. Although the program never spends much consecutive time in the short code sequence, the program nevertheless spends a majority of its execution time in that code.

In prior art systems, specific program execution measurements usually required auxiliary hardware such as a logic analyzer. A common prior art technique is to determine, at random instants of time, whether the program is executing code within the sequence under study. One can infer from the proportion of samples that are within the code sequence, what proportion of time is spent within that code sequence.

In contrast to the approximate methods of the prior art, the instruction complete counter of this invention permits easy measurements of the time spent in particular sections of a program without use of equipment external to the microprocessor. As previously described, the instruction set for the microprocessor of this invention may include instructions for reading the instruction complete counter for a particular execution level upon command. Thus, the user program includes a statement at the start and the end of the program section that reads the instruction complete counter and calculates and reports a difference in the readings. The ratio of the total number of instructions completed within the particular section of the program to the total number of instructions completed by the program represents the percentage of time spent in the particular section of code.

The instruction complete counter can also be used for testing the microprocessor itself. Handling of exceptions is a complex aspect of microprocessor design that is particularly prone to error. In particular, the interaction of particular instructions or addressing modes with the initiation of an exception must be exhaustively tested when a new microprocessor is implemented. The testing is often done using many short code sequences whose expected behavior can be compared with actual behavior. Such code sequences are run with traps and interrupts induced by various means that include external hardware and various software devices.

Instruction complete counter traps are an easy means for initiating a trap at a particular instruction in the code sequence. As described above, prior art means for initiating a trap at a particular instruction in the code sequence include trace trapping, breakpoint trapping and interrupts. Trace trapping disrupts the usual behavior of the microprocessor in a way that could disguise a problem, however. Breakpoint trapping for this purpose, in contrast, requires dynamic code modification of a fairly sophisticated nature. Interrupts require external hardware that must be synchronized with the program flow. The advantage of using the instruction complete counter trap in this application is its ease of use, involving only the setting of bits in one or more control registers to enable the instruction complete counter trap and loading the instruction complete counter with a specified number of instructions to be executed before initiation of the trap.

Figure 3:
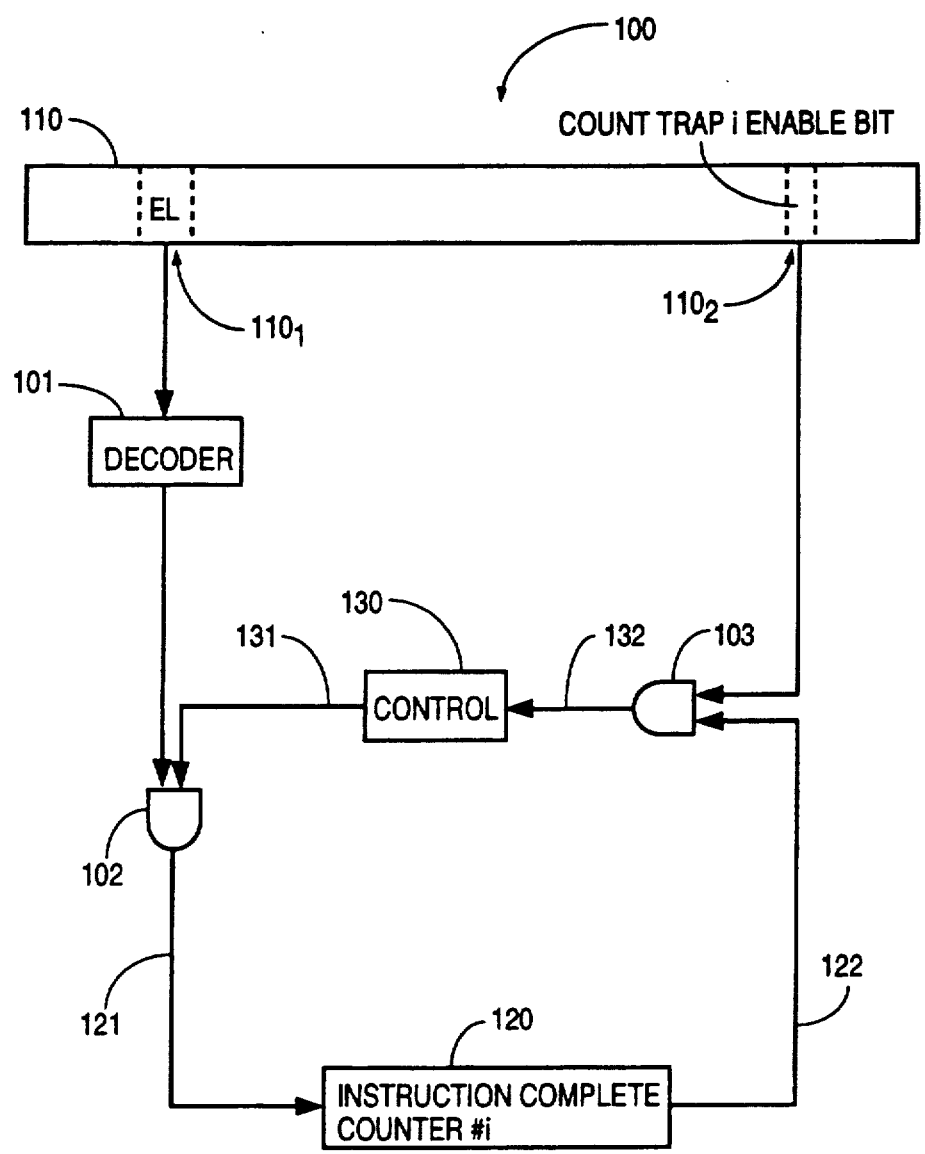
FIG. 3 illustrates a block diagram of the instruction counter circuit of this invention for each execution level of the microprocessor.

One embodiment of the instruction complete counter circuit according to the principles of this invention is shown in FIG. 3. The circuit in FIG. 3 is included on the same silicon as the microprocessor. In another embodiment (not shown), the instruction complete counter circuit could be implemented externally to a microprocessor using discrete components. This embodiment requires an instruction complete signal to appear at one of the pins on the microprocessor package. However, pins are a very valuable commodity for a microprocessor. Adding a pin to a microprocessor package and using external circuitry of the complexity of the instruction complete counter of this lo invention is usually a much more costly option than including such circuitry on the same silicon with the microprocessor. Therefore, the inclusion of the instruction complete counter circuitry on the same structure, usually a silicon semiconductor chip, as the microprocessor is preferred.

The microprocessor having control unit 130 (FIG. 3) has other connections to the microprocessor and other components within the microprocessor, but since these connections and components are not directly related to the principles of this invention, they are not shown in FIG. 3. Any microprocessor or any processor that executes a series of program instructions can serve as a basis for this invention. More generally, the principles of this invention are applicable to any device that executes a number of instructions where knowledge of the number of instructions completed provides the user assistance in utilization of the device.

In one embodiment, the microprocessor of this invention includes an instruction complete counter circuit 100, as in FIG. 3, for each non-zero execution level of the microprocessor. Program status word (PSW) 110 and control unit 130 are elements that are common in microprocessors but the implementation of PSW 110 and control unit 130, as well as the names of these features, may be different in different microprocessors. The program status word, sometimes referred to in the literature as the processor status word or the conditions code register, is a special purpose register that contains, for example, the status of the most recent instruction results, trap bits and interrupt priorities or similar information (see FIG. 1). Control unit 130 is that portion of a processor or microprocessor that controls the execution of instructions, and in particular includes the portion of the processor or microprocessor that generates a signal or signals that indicate completion of an instruction. In the prior art μPD70616, portions of the arithmetic and logic unit (ALU), the register file, the microinstruction sequencer and the microinstruction readonly only memory (ROM) are included in what is represented in FIG. 3 as the control unit.

Program status word 110 (FIG. 3) of the microprocessor includes instruction complete counter trap i enable bits 110(2) and execution level bits 110(1). Here, i refers to the execution level. PSW 110 has one instruction complete counter trap i enable bit for each non-zero execution level of the microprocessor. To implement this invention in the μPD70616(V60) microprocessor, bits 21-23 (FIG. 1) of the PSW, which are not used but which are in the portion of the PSW which can be written only when the V60 is operating at execution level 0, are configured to function as instruction complete counter trap enable bits, as described more completely below. Alternatively, the execution level bits and the instruction complete counter trap enable bits can be allocated to any register used in control of a microprocessor. The important aspect of the invention is that a microprocessor has (i) a means for distinguishing between execution of instructions associated with the user program and execution of instructions associated with operation of the microprocessor; and (ii) a means for selectively enabling an instruction complete counter trap.

Execution level bits 110(1) in PSW 110 (FIG. 3) are connected, in hardware, to the input terminals of a decoder 101. The output signal of decoder 101, which is associated with the execution level in question, as described below, is connected to a first input terminal of AND gate 102. The second input terminal of AND gate 102 is connected to the instruction complete line 131 from control unit 130. The output terminal of AND gate 102 is connected to the input terminal of instruction complete counter 120 and the output terminal of instruction complete counter 120 drives a first input terminal of a second AND gate 103. The second input terminal of AND gate 103 is connected to instruction complete counter trap i enable bit 110(2) in PSW 110. The output terminal of AND gate 103 is connected to force exception line 132 of control unit 130.

Assuming that the instruction complete counter is enabled, when a program is executing, the execution level bits 110(1) in PSW 110 provide input signals to decoder 101 in circuit 100 for that execution level. For a microprocessor such as the μPD70616, which has four execution levels, the output signals for each execution level decoder are given in Table 1. Table 1 is illustrative of one embodiment of this invention and is not intended to limit the invention to the specific embodiment shown.

TABLE 1

| Execution Level Bits | Execution Level 1 Decoder Output Signal | Execution Level 2 Decoder Output Signal | Execution Level 3 Decoder Output Signal |
|---|---|---|---|
| 0 0 | 0 | 0 | 0 |
| 0 1 | 1 | 0 | 0 |
| 1 0 | 0 | 1 | 0 |
| 1 1 | 0 | 0 | 1 |

In response to the signals from bits 110(1), decoder 101 provides a high signal on the first input terminal of AND gate 102. The output signals of decoder 101 in conjunction with AND gate 102 provide a means for selectively enabling counter 120 so that counter 120 counts only completed instructions associated with the user program at the execution level of counter 120. Upon completion of each instruction, control unit 130 generates a high signal on instruction complete line 131, as described below, to the second input terminal of AND gate 102. Hence, AND gate 102 has two high input signals and the output signal from AND gate 102 goes high. This low to high transition on the decrement input of the instruction complete counter 120 causes the counter to decrement by one. While AND gate 102 has been described above, any logic gate, which generates an output signal having a selected level in response to a first and a second input signal, each input signal having a selected level, can be used as the means to both enable and decrement instruction complete counter 120.

If instruction complete counter trap i enable bit 110(2) is not enabled, instruction complete counter 120 continues to decrement and if counter 120 reaches zero, instruction complete counter 120 simply overflows and operation continues.

However, if instruction complete counter trap i enable bit 110(2) is enabled, as described below, AND gate 103 has a high input signal on the second input terminal. Thus, bit 110(2) provides an enablement signal to AND gate 103 and when AND gate 103 receives a high signal from instruction complete counter 120, AND gate 103 generates a signal which causes the microprocessor to switch from the normal mode of operation to the exception mode of operation in which the instruction complete counter trap handler controls operation of the microprocessor.

The signal on the instruction complete counter output line 122 to the first terminal of AND gate 103 is low until counter 120 reaches zero. When instruction complete counter 120 reaches zero, the counter generates a high output signal and in turn the signal on the second input terminal of AND gate 103 goes high. In response to the two high input signals, AND gate 103 generates a high output signal on force exception line 132 to control unit 130. Receipt of the high signal from AND gate 103 by control unit 130 initiates the instruction complete counter trap which in turn causes the microprocessor to save the current state of the microprocessor to memory and to transfer control to the instruction complete counter trap handler. Hence, the signal on line 132 initiates a switch from the normal mode of operation of the microprocessor to the exception mode of operation of the microprocessor.

In the prior art V60 microprocessor, traps numbered 0, 5, 6, 15, 30, 31 and 33-47 are available and any one of these traps could be assigned as the instruction complete counter trap. The instruction complete counter trap handler is software that is part of the operating system and can provide an entry into the interactive debugger so that the programmer can single step through the subsequent program in a conventional manner.

According to the principles of this invention, instruction complete line and force exception line for control unit 130 must be ascertained. The line which carries a signal that indicates completion of an instruction depends upon the microprocessor in which instruction complete counter circuit is implemented. If the microprocessor has an instruction trace trap mechanism which is initiated by a signal generated after execution of each instruction, the instruction complete line of this invention would be connected to the line carrying the signal used to initiate the instruction trace trap handler.

In another microprocessor, a control programmable logic array (PLA) receives a multiplicity of input signals and generates specific logic states in response to the input signals on a multiplicity of input lines. A specific logic state (bit pattern) on the control PLA output lines represents completion of an instruction. In this microprocessor, a decoder would be connected to the output lines of the control PLA so that when the specific logic state corresponding to completion of an instruction is present on the control PLA output lines, the decoder generates an instruction complete signal. In yet another microprocessor, a line of microcode could represent completion of an instruction. In this microprocessor, the instruction complete signal would be generated upon execution of the line of microcode. For each microprocessor, the microprocessor design engineer can identify the instruction complete signal for that microprocessor.

Force exception line 132 to control unit 130 is simply the microprocessor line or lines which carry signals that are used to initiate traps in the microprocessor.

To implement the instruction complete counter operation, as described above, requires means for reading and writing the counters. In one embodiment, two instructions, called "read count" and "write count", are added to the instruction set of the microprocessor.

The "read count" instruction has a source operand to specify the execution level and a destination operand to specify where (memory or register) the count for that execution level is to be written. When the microprocessor executes the "read count" instruction, the execution level is determined from the source operand. In this embodiment, if that execution level is not 1, 2 or 3 then an illegal data field trap is forced. An illegal data field trap is provided by prior art V60 microprocessor for invoking the operating system to manage an instruction which is illegal by virtue of improper input data. If, however, the execution level is 1, 2 or 3, the corresponding instruction complete counter is read and the result written to the destination operand.

The "write count" instruction also has two operands, the first of which can take any unsigned integer value whereas the second can take only values 1, 2 or 3, other values cause an illegal data field trap, as described above. If the second operand is 1, 2 or 3, the value from the first operand is written to the indicated instruction complete counter. The unsigned integer value is entered in the instruction complete counter for the specified execution. Thus, the instruction complete counter is programmed, i.e. set to a selected value.

In a preferred embodiment, an important feature of this invention is that only operating system software is able to write to the instruction complete counters, i.e., "write count" is a privileged instruction, because otherwise the operating system cannot depend upon the values computed by these counters. For example, user code could accidentally or intentionally corrupt the values in the counters if "write count" was not a privileged instruction. While it is not essential to make "read count" a privileged instruction, there is no harm in doing so and it may offer advantages for the circuit implementation. Enabling and disabling the instruction complete counter traps, i.e., setting the appropriate enable bit also is reserved as a privileged operation because the operating system, having the responsibility to handle traps when they occur, must in all instances be able to fully control the enabling of traps. In the μPD70616, bits 21-23 of the upper half of the PSW can be utilized as the instruction complete counter trap enable bits. Bit 21 is used to enable instruction complete counter trap for execution level 1, bit 22 for execution level 2 and bit 23 for execution level 3.

In the embodiment described above, an instruction complete counter circuit was used for each non-zero execution level of the microprocessor. In another embodiment, only one instruction complete counter circuit is used for all the non-zero execution levels. In this embodiment, microprocessor hardware includes instruction complete counter registers for each execution level. Upon a change of execution level, microprocessor hardware reads the instruction counter and stores the reading in an instruction complete counter register for the execution level of the program being processed by the microprocessor and writes the reading in the instruction complete counter register for the new execution level to the instruction complete counter. Hence, microprocessor hardware swaps instruction complete counts between the instruction complete counter registers and the instruction counter as the execution level changes. Again, the lowest execution level, level 0, has no instruction complete counter capability.

The embodiment of this invention wherein a microprocessor includes instruction counter circuit 100 (FIG. 3) for each non-zero execution level of a microprocessor may be used in a multi-tasking operating system environment although this application introduces some special requirements for system software. In this application, multiple tasks, often initiated by different users of the system, share the microprocessor with each task using the processor for a period of time before relinquishing the processor to another task. The act of switching from one task to another, called a task switch, involves saving the state (the values in the registers and counters) to memory, loading the state of the new task and then transferring control to the new task. The task switch is performed by the operating system which is called into action through an interrupt or trap. The V60, in common with many other microprocessors, provides hardware support for task switching through two instructions, "SAVE-TASK" and "RESTORE-TASK". SAVE-TASK saves the state of the processor to memory and RESTORE-TASK restores the state from a memory image, called a task control block. These instructions have two operands, one of which specifies the starting location of the task control block and the other of which is used to keep certain registers from being saved and restored.

The implementation of this invention enlarges the notion of the processor's state to include the three instruction complete counters. As such, the task control block is enlarged by three words to accommodate the three values in the instruction complete counters. The SAVE-TASK and RESTORE-TASK instructions are extended to include saving and restoring the instruction complete counter values. These changes to the two instructions are useful, but not essential because the necessary saving and restoring can also be done by software. In any event, when a task is suspended by a task-switch, the instruction complete counter values and other state information is saved to memory. Other task are allowed to execute and thereby modify the counters. When the first task is eventually resumed, the instruction complete counters are restored to the value of the previous task-switch so that the task can resume as though nothing had happened.

While several embodiments of the microprocessor debugging facility of this invention for software debugging has been disclosed, other embodiments for providing the number of instructions completed in a computer program will be apparent to those skilled in the art in view of the above disclosure. The above disclosure is illustrative only and is not intended to limit the scope of the invention to the embodiment shown.

I claim:

1. A method for debugging computer program instructions executing in a processor in a normal mode of operation, wherein said processor has in addition to the normal mode of operation, an exception mode of operation, a control unit, and a programmable counter and further wherein said control unit generates an instruction complete signal upon completion of each computer program instruction and said programmable counter is responsive to said instruction complete signal, said method comprising the steps of:

loading said computer program instructions by said processor so that said processor begins execution of said computer program instructions in said normal mode of operation;

reading a value of said programmable counter to obtain a first reading;

charging the value of said programmable counter in a selected direction in response to each instruction complete signal from said control unit;

reading the value of said programmable counter upon termination of execution of said computer program instructions to obtain a second reading;

forming a difference between said first reading and said second reading;

reloading said computer program instructions by said processor so that said processor begins execution of said computer program instructions in said normal mode of operation;

setting the programmable counter to a first selected number that is less than said difference between said first reading and said second reading;

changing the value of said programmable counter in said selected direction in response to each instruction complete signal from said control unit; and forcing a change of mode of operation to the exception mode upon said programmable counter reaching a second selected number.

2. The method of claim 1 wherein the step of forcing a change to the exception mode comprises initiating a trap handler.

3. The method claim of 1, wherein said processor has an execution level and further wherein said steps are performed for said execution level of said processor.

4. The claim of 1, wherein said processor has a plurality of execution levels and further wherein said steps are performed for one of said execution levels in said plurality of execution levels of said processor.

5. A system for executing computer program instructions including:

a control register having an execution level bit and a count trap enable bit;

a decoder, operatively coupled to said execution level bit in said control register, having an input line coupled to said execution level bit and an output line wherein an output signal on said output line of said decoder has a first level upon said execution level bit being set and a second level otherwise;

a control unit having a force exception input line and an instruction complete output line wherein:
  said control unit has a normal mode of operation and an exception mode of operation;
  said control unit executes said computer program instructions in said normal mode of operation and upon completion of execution of each computer program instruction generates an instruction complete signal on said instruction complete output line; and
  said control unit enters said exception mode of operation upon receiving a signal on said force exception input line;
a first logic gate having first and second input terminals and an output line wherein:
  said first input terminal is connected to said decoder output line;
  said second input terminal is connected to said control unit instruction complete output line; and
  said first logic gate generates an active signal on said output line in response to said decoder first level signal on said first terminal in combination with an instruction complete signal on said second input terminal;
a counter having an input line and an output line wherein:
  said counter input line is connected to said first logic gate output line;
  said counter changes value in response to said active output signal of said first logic gate; and
  said counter generates a signal on said counter output line upon the value of said counter equaling a predetermined value; and
a second logic gate having first and second input terminals and an output line wherein:
  said first input terminal is connected to said count trap enable bit;
  said second input terminal is connected to said counter output line; and
  said output line is connected to said force exception line of said control unit
    wherein said second logic gate generates a signal on said output line of said second logic gate in response to said count trap enable bit being set in combination with said output signal from said counter and in response, to said second logic gate output signal, said control unit enters said exception mode of operation.

* * * * *